US012618590B2

(12) United States Patent
Nettelroth et al.

(10) Patent No.: US 12,618,590 B2
(45) Date of Patent: May 5, 2026

(54) METHOD FOR MEASURING HELIOSTATS, AND METHOD FOR CALIBRATING HELIOSTATS

(71) Applicant: Deutsches Zentrum Für Luft- und Raumfahrt e.V., Bonn (DE)

(72) Inventors: Vincent Nettelroth, Cologne (DE); Moritz Leibauer, Düsseldorf (DE)

(73) Assignee: Deutsches Zentrum Für Luft- und Raumfahrt e.V., Bonn (DE)

( * ) Notice: Subject to any disclaimer, the term of this patent is extended or adjusted under 35 U.S.C. 154(b) by 200 days.

(21) Appl. No.: 18/720,860

(22) PCT Filed: Dec. 16, 2022

(86) PCT No.: PCT/EP2022/086317
§ 371 (c)(1),
(2) Date: Jun. 17, 2024

(87) PCT Pub. No.: WO2023/111252
PCT Pub. Date: Jun. 22, 2023

(65) Prior Publication Data
US 2025/0067479 A1     Feb. 27, 2025

(30) Foreign Application Priority Data

Dec. 17, 2021   (DE) ..................... 10 2021 133 719.4

(51) Int. Cl.
*F24S 50/20*          (2018.01)
(52) U.S. Cl.
CPC ........... *F24S 50/20* (2018.05); *F24S 2050/25* (2018.05)
(58) Field of Classification Search
CPC ............................. F24S 50/20; F24S 2050/25
See application file for complete search history.

(56) References Cited

U.S. PATENT DOCUMENTS 7,994,459 B2    8/2011   Zavodny et al.
9,222,702 B2   12/2015   Goldberg
(Continued)

FOREIGN PATENT DOCUMENTS

CN         109828612 B     9/2021
DE          3325919 A1     1/1985
(Continued)

OTHER PUBLICATIONS

International Search Report with English translation and Written Opinion issued on Mar. 27, 2023, in corresponding International Application No. PCT/EP2022/086317, 19 pages.
(Continued)

*Primary Examiner* — Thanh Luu
(74) *Attorney, Agent, or Firm* — Maier & Maier, PLLC

(57)          ABSTRACT

A method for measuring heliostats including: a) providing a light source, b) aligning at least some heliostats to be measured in order to reflect light from the light source onto a predefined target point or target area in the sky or in the vicinity of the solar tower; c) moving a flying apparatus having at least one camera along a predefined flight pattern around and over the target point or target area, and simultaneously capturing images of one of the one or more heliostats to be measured by the camera at a predefined time interval; d) evaluating the images wherein a virtual target is calculated from the images by a previously determined or stored capturing position of the corresponding image; e) determining, by the focal point on the virtual target, a target vector of each of the heliostats to be measured and comparing it with a target value.

17 Claims, 1 Drawing Sheet

(56) References Cited

U.S. PATENT DOCUMENTS

| | | | |
|---|---|---|---|
| 2018/0299264 A1 | 10/2018 | Hines | |
| 2023/0341151 A1* | 10/2023 | Smit | F24S 23/70 |

FOREIGN PATENT DOCUMENTS

| | | |
|---|---|---|
| DE | 102011080969 A1 | 2/2013 |
| DE | 102013207022 B3 | 6/2014 |
| DE | 102015217086 A1 | 3/2017 |
| DE | 102015224982 A1 | 6/2017 |
| EP | 1717568 A2 | 11/2006 |
| WO | 2022070153 A1 | 4/2022 |

OTHER PUBLICATIONS

Sattler et al., "Review of heliostat calibration and tracking control methods", Solar Energy, Elsevier, Jun. 30, 2020, vol. 207, 23 pages.
Roger et al., "Verfahren zur Vermessung und Kalibrierung von Heliostaten", Jul. 4, 2018, 32 pages https://elib.dlr.de/122783/1/20180704_Soko18_Vermessung_Kalibrierung_Helios_FINAL.pdf Machine translation of the title: "Method for measuring and calibrating heliostats".
Office Action issued on Sep. 20, 2024, in corresponding German Application No. 10 2021 006 735.5, 14 pages.
Sattler et al., "Review of Heliostat Calibration and Tracking Control Methods", Solar Energy, Elsevier Ltd, Jun. 30, 2020, vol. 207, pp. 110-132.
Examination Report issued on Jan. 21, 2026, in corresponding Chilean Application No. 2024-01819, 28 pages.

* cited by examiner

METHOD FOR MEASURING HELIOSTATS, AND METHOD FOR CALIBRATING HELIOSTATS

FIELD

The present invention relates to a method for measuring heliostats of a heliostat field of a solar tower power plant, which heliostat field comprises a plurality of heliostats, as well as to a method for calibrating heliostats.

BACKGROUND

Solar tower power plants comprise a heliostat field of a plurality of heliostats, each heliostat including at least one reflector with a mirror surface, via which solar radiation can be concentrated onto an absorber.

The heliostats are often arranged along curved paths around the solar tower. The distances of the heliostats to the tower/absorber may vary between several hundred meters and more than one kilometer, depending on the position of the heliostat. Each reflector has a focal length adapted to the distance of the reflector to the absorber.

In operation, the heliostats track the position of the sun. The characterizing parameters that are necessary for precise tracking of the heliostats are usually the following: two angles to describe the tilt (azimuth axis, elevation axis), offset for the elevation and azimuth axes respectively, two parameters that describe the non-linearity of the drives, an angle that describes the deviation of 90° between the elevation and azimuth axes, as well as the deviation between the optical axis defined by the mirrors and the optical axis as actually defined by the position of the axes.

In order to achieve the most accurate focusing of a heliostat on the absorber, the offsets and parameters mentioned must be determined to enable calibration of the heliostat control. Furthermore, the offsets and parameters must also be checked during operation in order to make necessary adjustments.

The known methods for determining the offset use the so-called camera target method, in which a focal spot of the heliostat on a white, diffusely reflecting target is observed with a camera.

There are also approaches for photometric evaluation of images of the mirror surface. These are described in EP 1 717 568 A2 and DE 10 2011 080 969 of the applicant. In these methods, reflections of a target on the mirror surface of the reflector are recorded with a camera and evaluated. These two known methods are optimized for the measurement of parabolic trough collectors.

The known flux density-based methods require a fixed hardware installation on the tower and are also dependent on the position of the sun or the availability of direct solar radiation. Individual calibration of heliostats takes a very long time due to the large number of heliostats.

It is known from DE 10 2015 217 086 A1 to fly a flying apparatus over a heliostat field and to record the image of the flying apparatus generated on the reflector of a heliostat in order to deduce the orientation of the heliostat by means of the position of the flying apparatus at the time of recording and the position of the image on the reflector.

SUMMARY

Thus, it is an object of the present invention to provide a method for measuring heliostats which is independent of solar irradiation and can be performed with little hardwarerelated technical effort, as well as very precisely and very quickly. Further, it is another object of the present invention to provide a method for calibrating heliostats.

The method for measuring heliostats of a heliostat field with a plurality of heliostats of a solar tower power plant comprising a solar tower, the heliostats each comprising at least one reflector having a mirror surface, provides the following steps:

a) providing a light source, wherein the light source is arranged in a reflection area of at least some heliostats to be measured, b) aligning at least some heliostats to be measured in order to reflect light from the light source onto a predefined target point or target area in the sky or in the vicinity of the solar tower, c) moving a flying apparatus having at least one camera along a predefined flight pattern around and Over the target point or target area, and simultaneously capturing images of one of the one or more heliostats to be measured by means of the camera at a predefined time interval;

d) evaluating the images, wherein, for each of the heliostats to be measured in at least some of the images, it is determined whether light from the light source has been reflected into the camera, and wherein a virtual target is calculated from the images by means of a previously determined or stored capturing position of the corresponding image, wherein the focal point for each heliostat to be measured is determined on the virtual target;

e) determining, by means of the focal point on the virtual target, a target vector of each of the heliostats to be measured and comparing it with a target value in order to determine a target/actual deviation, wherein at least steps a) to c) are carried out at a time with low solar radiation or at night.

A time with low solar radiation may be, for example, a time during the dawn of a day or a time with heavy clouds at which usually no solar radiation is concentrated onto the solar tower by the heliostats.

"Reflection area" of a heliostat refers to the area which is "visible" by the heliostat, i.e. the area from which something can be reflected by the mirror surface of the heliostat.

The light source is preferably arranged on a tower or the solar tower. However, it can also be arranged at a different location or be movable and arranged on a second flying apparatus, for example.

The method according to the invention has the particular advantage that a very large number of heliostats can be measured in a simple way by photographing them while the flying apparatus flies over them and then evaluating the images. For example, the method steps b) to e) can also be repeated, with different orientations of the heliostats to be measured. Here, a data acquisition can be performed in very short cycles for the different orientations of the heliostats. The method according to the invention thus advantageously enables parallelized or almost parallelized data acquisition by simultaneously recording several heliostats on the one hand and enables a high temporal density of the measurement point acquisition on the other hand.

Performing process steps a) to c) at night has the particular advantage that due to darkness, there is a high contrast between illuminated and non-illuminated heliostats and, in addition, ongoing operation during the day is not disturbed. The effort involved in evaluating the images is also relatively low, as it is only necessary to determine for each image and each heliostat to be measured whether light was reflected into the camera or not. This means that only binary information per position on the flight route needs to be evaluated.

In addition, the variant of the method according to the invention, in which the light source is arranged on a tower or the solar tower, has the advantage that the concentrated light beams emanate from the light source on the tower or the solar tower and thus from a stationary light source, so that, unlike when using the sun, for example, the position of the heliostats does not have to be changed to adapt to the changing position of the light source.

The light source also poses no risk of damage to the flying apparatus, for example, due to excessive radiation, as could occur when using solar radiation, for example.

The quality of the measuring result can be increased by selecting the target point or target area in the sky or in the vicinity of the solar tower. For example, the distance of the target point or target area from the heliostats can be increased, which can increase the resolution and stability of the method. Telephoto lenses can be used to further ensure the quality of the images captured even at greater distances.

The images captured in step c) can, for example, also be recorded as a video sequence or sequences.

The method according to the invention may provide that the light source is formed by a light spot generated on a target, the target being attached to the one tower, preferably the solar tower. The target is illuminated by an external light to form the light spot, which reflects the radiation forming the light spot, or the target is backlit by a light to form the light spot. This has the advantage that targets already present on the solar tower can be used to carry out the method according to the invention. In addition, the targets are usually arranged in the immediate vicinity of a receiver on the tower so that it is ensured that the heliostats to be measured can receive the light reflected by the target and are not shadowed by another heliostat. The light can be arranged on the ground, for example, so that no additional device-related technical effort is required on the solar tower.

In addition or as an alternative, it may be provided that the light source is formed by one or more lights arranged on the solar tower.

It is preferably provided that the size of the light spot or a lighting area of the light or the lights is adapted to the size of a reflection of the sun by at least one of the heliostats onto the solar tower, preferably on the target. It may also be provided that the shape of the light spot or a lighting area of the light or the lights is adapted to the shape of a reflection of the sun by at least one of the heliostats onto the solar tower, preferably on the target. When a plurality of lights is used, the lighting are formed by the lights does not necessarily have to be completely "illuminated", but the lights may also be spaced apart and be arranged according to the shape and/or the size of the reflection of the sun.

By adapting the size and/or shape of the light spot or the lighting area to the image of the sun reflected onto the solar tower, it is achieved that the portion used by a heliostat for reflection is comparable to the portion used in normal use of the heliostat. Thereby, a high precision is achieved in measuring the heliostats.

The flying pattern along which the flying apparatus is moved may include a meander or spiral shape. This advantageously allows to cover a large area. The flying apparatus can be a drone, for example.

It is preferably provided that the flight pattern is arranged in a plane in which the preset target point or the target area is located. It is thereby avoided that conversions of the captured images have to be made with regard to the plane in which the target area or the target point is located. It may also be provided that the flight pattern extends along a virtual sphere, which is advantageous in that each heliostat has the same inclination with respect to an area formed by the flight pattern.

Steps d) and e) can be performed offline of the flying apparatus after the end of step c). In other words: The images can be transmitted from the flying apparatus to a central computer, an the same can perform the evaluation of the image of steps a) to c). Basically, the evaluation of the images can of course already be started during the flight of the flying apparatus.

The method according to the invention can provide that several markers are provided in the heliostat field, wherein in step d) individual heliostats to be measured can be identified by means of the markers in the images. This ensures that a heliostat can be clearly identified in each image so that it can be determined for this heliostat whether light is reflected into the camera or not.

When identifying individual heliostats to be measured, a simulation including the position of at least some of the heliostats and the markers can be used and the simulation can be compared with the images. Thus, a pixel in the image can be assigned to a heliostat in a simple manner.

Another method for measuring heliostats of a heliostat field with a plurality of heliostats of a solar tower power plant comprising a solar tower, the heliostats each comprising at least one reflector having a mirror surface, comprises the following steps:

a) providing a movable light source and moving the light source through a reflection are of at least some heliostats to be measured, b) determine the position of the light source at different times, c) aligning at least some heliostats to be measured in order to reflect light from the light source onto a target surface, wherein a plurality of cameras is arranged in a grid on the target surface, d) capturing images of one or more of the heliostats to be measured using the cameras at a specified time interval, e) evaluating the images, wherein for each of the heliostats to be measured it is determined in at least some of the images whether light from the light source has been reflected into one of the cameras, and wherein the focal point for each heliostat to be measured on the target surface is determined from the images by means of the previously determined position of the light source, f) determining, by means of the focal point on the virtual target, a target vector of each of the heliostats to be measured and comparing it with a target value in order to determine a target/actual deviation, wherein at least steps a) to c) are carried out at a time with low solar radiation or at night.

The further variant of a method according to the invention is essentially a reversal of the method according to the invention described above. As such, the advantages described above also apply to this variant of the method. Instead of a stationary light source and a movable camera, this variant provides a movable light source and a grid of stationary cameras. However, it is basically conceivable that one or more movable cameras are arranged on the target area, which can be positioned at different measuring points that correspond to the grid points. For example, a camera or a plurality of cameras could be moved along rails and capture images at the measuring points.

It may be provided that the camera or the cameras each have a fisheye lens or that two cameras are arranged or can be arranged per measuring point, which are directed in different directions. Thus, a particularly large area can be captured per measuring point.

The light source can be moved using a flying apparatus.

The position of the light source can be determined by tracking the light source by means of a tachymeter.

The light source can be a balloon illuminated from inside.

The light source can be moved along a trajectory which is adapted to different sun orbits along which the sun moves in the course of a year. The measuring can thus be performed independent of the position of the sun, wherein data can also be acquired at any time for measuring points that correspond to a position of the sun which occurs only for a short time in the course of a year. Furthermore, a large amount of data can be acquired in a very short time, i.e. with a high temporal density of the data points.

The method according to the invention can provide that several markers are provided in the heliostat field, wherein in step e) individual heliostats to be measured can be identified by means of the markers in the images. This ensures that a heliostat can be clearly identified in each image so that it can be determined for this heliostat whether light is reflected into the camera or cameras or not.

The invention further provides a method for calibrating heliostats. Here, the method according to the invention can be performed. Thereafter, the heliostats to be measured can be calibrated using the target/actual deviation.

BRIEF DESCRIPTION OF THE FIGURES

In the following, the invention is described in more detail with reference to the following FIGURES.

The sole FIGURE is a schematic illustration of a solar tower power plant 10, a variant of the method according to the invention being described with reference thereto.

DETAILED DESCRIPTION

The method according to the invention serves for measuring heliostats 1 in a heliostat field 3 that has a plurality of heliostats 1 and is part of a solar tower power plant 10 that has a solar tower 7. The heliostats 1 each comprise a reflector 5 with at least one mirror surface.

A target 9 is arranged below a receiver 12 on the solar tower 7. This may be the target 9 which is used to calibrate the heliostat 1 in prior art methods. The target 9 is irradiated through an external light 11, so that a light spot 13 is formed on the target 9. The light spot 13 forms the light source used for the method according to the invention.

The method according to the invention is performed at a time of low solar radiation, for example at night. First, a part or all of the heliostats 1 are aligned, in order to reflect the light of the light source 13 onto a predefined target point 15. The target point 15 may be a point in the sky, for example.

A flying apparatus 17 that carries at least one camera flies along a predefined flying pattern around and over the target point 15, while simultaneously capturing images of the heliostats 1 by means of the camera.

Thereafter, the images are evaluated, wherein it is determined for each image whether light from the light source reflected by a heliostat 1 can be detected or not. Based on the capturing position of the corresponding image, determined or stored in advance, a visual target 19 is then calculated from the images. Based on the information whether light from the light source reflected by a heliostat 1 can be detected, it is possible to determine the focal point 23 of the corresponding heliostat 1 on the virtual target 19.

Thereafter, a respective target vector for each heliostat 1 can be determined based on the focal points 23 of the heliostats 1 on the virtual target 19. This target vector can be compared to a set value for the target vector which has been determined for example from the evaluation of the solar tower power plant or by a simulation. A target/actual deviation can be determined by comparison with the target value.

In the FIGURE, the end point of the target value for the target vector is shown as the target focus point 25.

The target/actual deviation can be used, for example, to calibrate the corresponding heliostat 1.

The light 11 can be designed such that the size and shape of the light spot 13 generated on the target 9 corresponds to the size and shape of a light spot generated by reflection of the sunlight on the target 9.

In order to be able to identify the individual heliostats 1 when evaluating the images, markers 21 can be provided in the heliostat field 3. The markers 21 can be recognized in the captured images and the position of the markers 21 facilitates the identification of individual heliostats 1. It can also be provided that a simulation of the heliostat field 3, which contains the heliostats 1 and the markers 21, can be used to identify the heliostats 1 by comparing them with the images.

The method according to the invention for measuring heliostats 1 can be used to calibrate the heliostats 1 by using the determined target/actual deviation to calibrate the heliostats 1.

The method according to the invention has the advantage that the measurement or calibration of the heliostats 1 can be performed at a time when the solar tower power plant 10 is not in operation, namely at night. The measuring can be performed independent of the position of the sun, wherein data can also be acquired at any time for measuring points that correspond to a position of the sun which occurs only for a short time in the course of a year. Furthermore, a large amount of data can be acquired in a very short time, i.e. with a high temporal density of the data points.

Furthermore, a large number of heliostats 1 can be measured simultaneously, as a large number of images with a large number or even all heliostats 1 can be captured in a very short time when flying over the heliostat field 3. Since it is only necessary to determine whether a heliostat 1 has reflected light from the light source into the camera so that the light from the corresponding heliostat 1 can be recognized on the image, the amount of data to be processed is comparatively small, so that the procedure can be carried out in a relatively short time.

Thus, the method according to the invention enables a time-saving measurement and calibration of heliostats 1, whereby the device-related technical effort required for the device can be kept very low.

LIST OF REFERENCE NUMERALS 1 heliostats
3 heliostat field
5 reflector
7 solar tower
9 target
10 solar tower power plant
11 external light
12 receiver
13 light spot
15 target point
17 flying apparatus 19 virtual target
21 marker
23 focal point

The invention claimed is:

1. A method for measuring heliostats in a heliostat field that has a plurality of heliostats and is part of a solar tower power plant that has a solar tower, the heliostats each having at least one reflector having a mirror surface, said method comprising the following steps:

a) providing a light source;

b) aligning at least some heliostats to be measured in order to reflect light from the light source onto a predefined target point or target area in the sky or in the vicinity of the solar tower;

c) moving a flying apparatus having at least one camera along a predefined flight pattern around and over the target point or target area, and simultaneously capturing images of one of the one or more heliostats to be measured by the camera at a predefined time interval;

d) evaluating the images, wherein, for each of the heliostats to be measured in at least some of the images, it is determined whether light from the light source has been reflected into the camera, and wherein a virtual target is calculated from the images by a previously determined or stored capturing position of the corresponding image, wherein the focal point for each heliostat to be measured is determined on the virtual target; and e) determining, by the focal point on the virtual target, a target vector of each of the heliostats to be measured and comparing it with a target value in order to determine a target/actual deviation, wherein at least steps a) to c) are carried out at a time with low solar radiation or at night.

2. The method according to claim 1, wherein the light source is formed by a light spot formed on a target, the target being arranged on a tower, and the target being irradiated by an external light to form the light spot and reflecting the radiation that forms the light spot, or the target being backlit by a light to form the light spot.

3. The method according to claim 2, wherein the size of the light spot or a lighting area of the light or the lights is adapted to the size of a reflection of the sun by at least one of the heliostats onto the solar tower, preferably on the target.

4. The method according to claim 2, wherein the shape of the light spot or a lighting area of the light or the lights is adapted to the shape of a reflection of the sun by at least one of the heliostats onto the solar tower, preferably on the target.

5. The method according to claim 1, wherein the light source is formed by one or more lights arranged on the solar tower.

6. The method according to claim 1, wherein the flight pattern includes a meander or spiral shape.

7. The method according to claim 1, wherein the flight pattern is arranged in a plane in which the preset target point or the target area is located.

8. The method according to claim 1, wherein steps d) and e) can be performed offline of the flying apparatus after the end of step c).

9. The method according to claim 1, wherein several markers are provided in the heliostat field, wherein in step d) individual heliostats to be measured can be identified by the markers in the images.

10. The method according to claim 9, wherein for identifying individual heliostats to be measured, a simulation including the position of at least some of the heliostats and the markers is used and the simulation is compared to the images.

11. A method for calibrating heliostats in a heliostat field that has a plurality of heliostats and is part of a solar tower power plant that has a solar tower, the heliostats each having at least one reflector having a mirror surface, said method comprising the following steps:

I) performing the method according to claim 1; and

II) calibrating the heliostats to be measured using the target/actual deviation.

12. A method for measuring heliostats in a heliostat field that has a plurality of heliostats and is part of a solar tower power plant that has a solar tower, the heliostats each having at least one reflector having a mirror surface, said method comprising the following steps:

a) providing a movable light source and moving the light source through a reflection are of at least some heliostats to be measured;

b) determine the position of the light source at different times;

c) aligning at least some heliostats to be measured in order to reflect light from the light source onto a target surface, wherein a plurality of cameras is arranged in a grid on the target surface;

d) capturing images of one or more of the heliostats to be measured using the cameras at a specified time interval;

e) evaluating the images, wherein for each of the heliostats to be measured it is determined in at least some of the images whether light from the light source has been reflected into one of the cameras, and wherein the focal point for each heliostat to be measured on the target surface is determined from the images by the previously determined position of the light source; and f) determining, by the focal point on the virtual target, a target vector of each of the heliostats to be measured and comparing it with a target value in order to determine a target/actual deviation, wherein at least steps a) to c) are carried out at a time with low solar radiation or at night.

13. The method according to claim 12, wherein the cameras each have a fisheye lens or that two cameras are arranged per measuring point, which are directed in different directions.

14. The method according to claim 12, wherein the light source is moved by a flying apparatus.

15. The method according to claim 12, wherein the position of the light source is determined by tracking the light source using a tachymeter.

16. The method according to claim 12, wherein the light source is an internally lit balloon.

17. The method according to claim 12, wherein the light source is moved along a trajectory which is adapted to different sun orbits along which the sun moves in the course of a year.

* * * * *